United States Patent [19]

Lauffer

[11] Patent Number: 4,934,238

[45] Date of Patent: Jun. 19, 1990

[54] DEVICE FOR CLAMPING A CIRCULAR SAW BLADE

[75] Inventor: Adelbert Lauffer, Reutlingen, Fed. Rep. of Germany

[73] Assignee: Chr. Eisele Maschinenfabrik GmbH & Co. KG, Kongen, Fed. Rep. of Germany

[21] Appl. No.: 210,757

[22] Filed: Jun. 23, 1988

[30] Foreign Application Priority Data

Jun. 30, 1987 [DE] Fed. Rep. of Germany ....... 3721470

[51] Int. Cl.[5] ......................... B23D 61/10; B27B 5/34

[52] U.S. Cl. ....................................... 83/666; 83/676; 83/698; 57/168

[58] Field of Search ................. 83/666, 698, 665, 676; 51/168; 409/231; 56/209 R

[56] References Cited

U.S. PATENT DOCUMENTS

| | | | |
|---|---|---|---|
| 3,440,915 | 4/1969 | Weyant | 83/666 |
| 3,656,393 | 4/1972 | Goellner | 83/666 |
| 3,889,333 | 6/1975 | Katz et al. | 83/666 |
| 4,657,428 | 4/1987 | Wiley | 83/666 X |

*Primary Examiner*—Donald R. Schran
*Attorney, Agent, or Firm*—John C. Evans

[57] ABSTRACT

In a device for clamping a circular saw blade, the saw blade is firmly clamped between two flanged rings and thereby connected to these so as to form an exchangeable tool unit which is pushed onto the free end of a saw shaft for rotation with the saw shaft and slidable displacement. Compression springs or the like are arranged between the tool unit and a stop face at the free end of the saw shaft to act upon one of the flanged rings and move the tool unit a short distance away from the stop face. A rotatingly mounted thrust plate which can be pressed centrically against the other flanged ring causes the tool unit to firmly engage on the stop face of the saw shaft.

7 Claims, 3 Drawing Sheets

DEVICE FOR CLAMPING A CIRCULAR SAW BLADE

The invention relates to a device for clamping a circular saw blade at the free end of a rotatingly driven saw shaft which is mounted in a cantilever manner on part of a machine structure and has a stop face at its free end.

In known circular saws, the circular saw blade is mounted on a pivotable or displaceable part of the machine structure, for example, on a gearbox, and the part of the machine structure is displaced relative to a clamped workpiece during the sawing operation. After the parting cut has been made, it is expedient for the saw blade to be withdrawn a short distance from the workpiece so as to prevent the face which has just been cut on the workpiece from being damaged by the saw blade when the part of the machine structure mentioned above is being withdrawn.

This is achieved in known machines by displacing the entire part of the machine structure supporting the saw blade, for example, a gearbox, parallel to the saw shaft. However, this requires complicated bearing assemblies and considerable forces.

The object of the invention is to design a device of the generic kind in such a manner as to allow the saw blade of a circular saw to be moved away in a simple manner from the cut workpiece face after a parting cut has been made. In accordance with the invention, the object is accomplished by the following features:

(A) The saw blade is firmly clamped between two flanged rings and thereby connected to these so as to form an exchangeable tool unit;

(B) the tool unit is mounted for sliding displacement on the free end of the saw shaft and for rotation together with the saw shaft;

(C) energy accumulating devices are arranged between the tool unit and the stop face at the free end of the saw shaft to act upon one of the flanged rings and move the tool unit a short distance away from the stop face, while the connection between the tool unit and the saw shaft enabling these to rotate together is simultaneously maintained;

(D) a rotatingly mounted thrust plate which can be pressed centrically against the other flanged ring causes the tool unit to engage firmly on the stop face.

The following description of a preferred embodiment serves in conjunction with the appended drawings to explain the invention in further detail. In the drawings.

Figure 1:
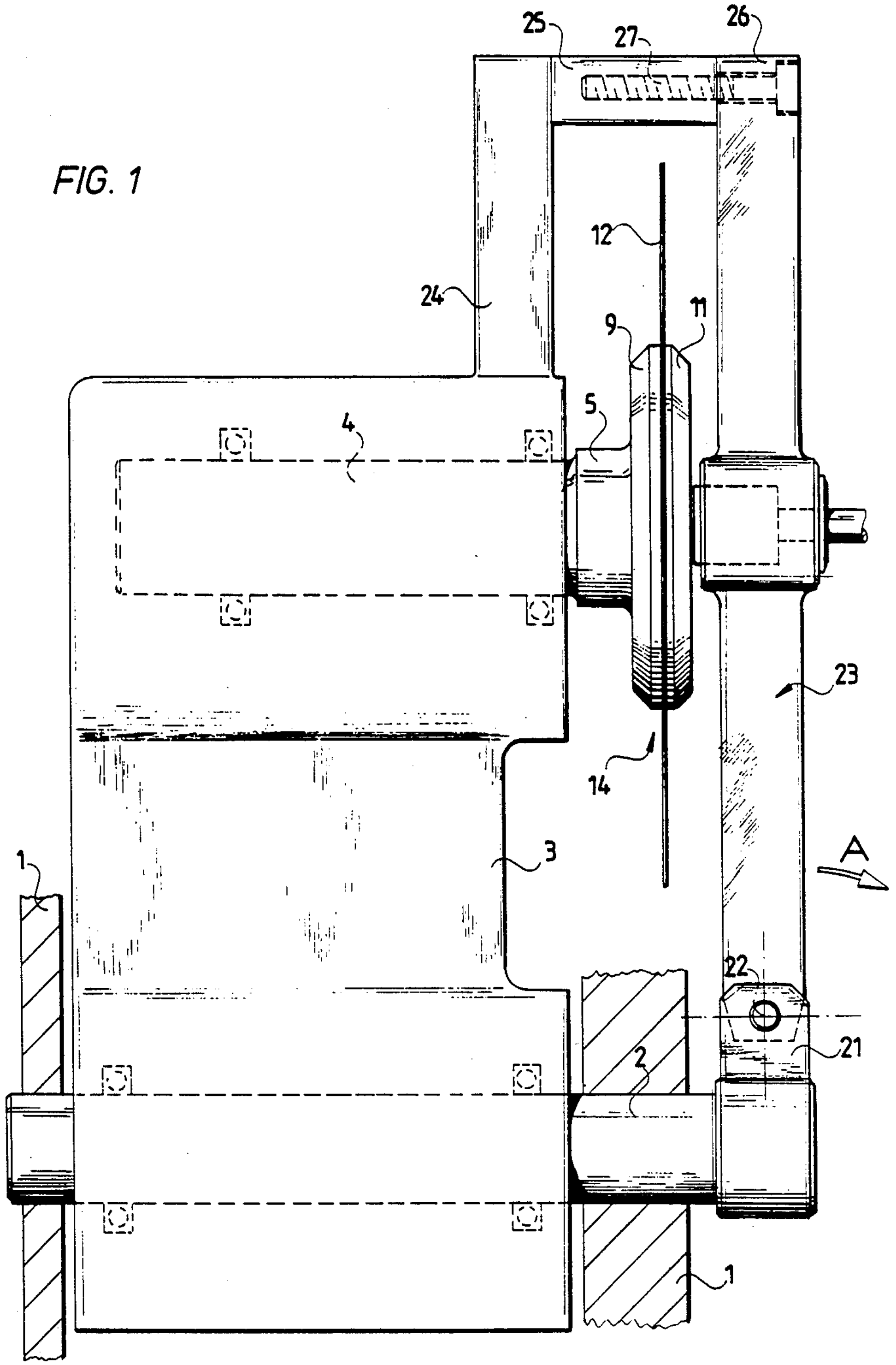
FIG. 1 is a plan view of a circular saw blade mounted on a pivotable gearbox.

A machine part in the form of a gearbox 3 is mounted for pivotal movement on a shaft 2 on the stationary structure 1 of a circular saw (not illustrated in detail). The direction of the pivotal movement extends perpendicular to the drawing plane of FIG. 1. A saw shaft 4 is mounted in a cantilever manner in gearbox 3. The free end 5 of the shaft 4 protrudes laterally beyond the gearbox 3. The saw shaft 4 is rotatingly driven by gear means and an electric motor in a manner known per se and, therefore, not illustrated.

Figure 2:
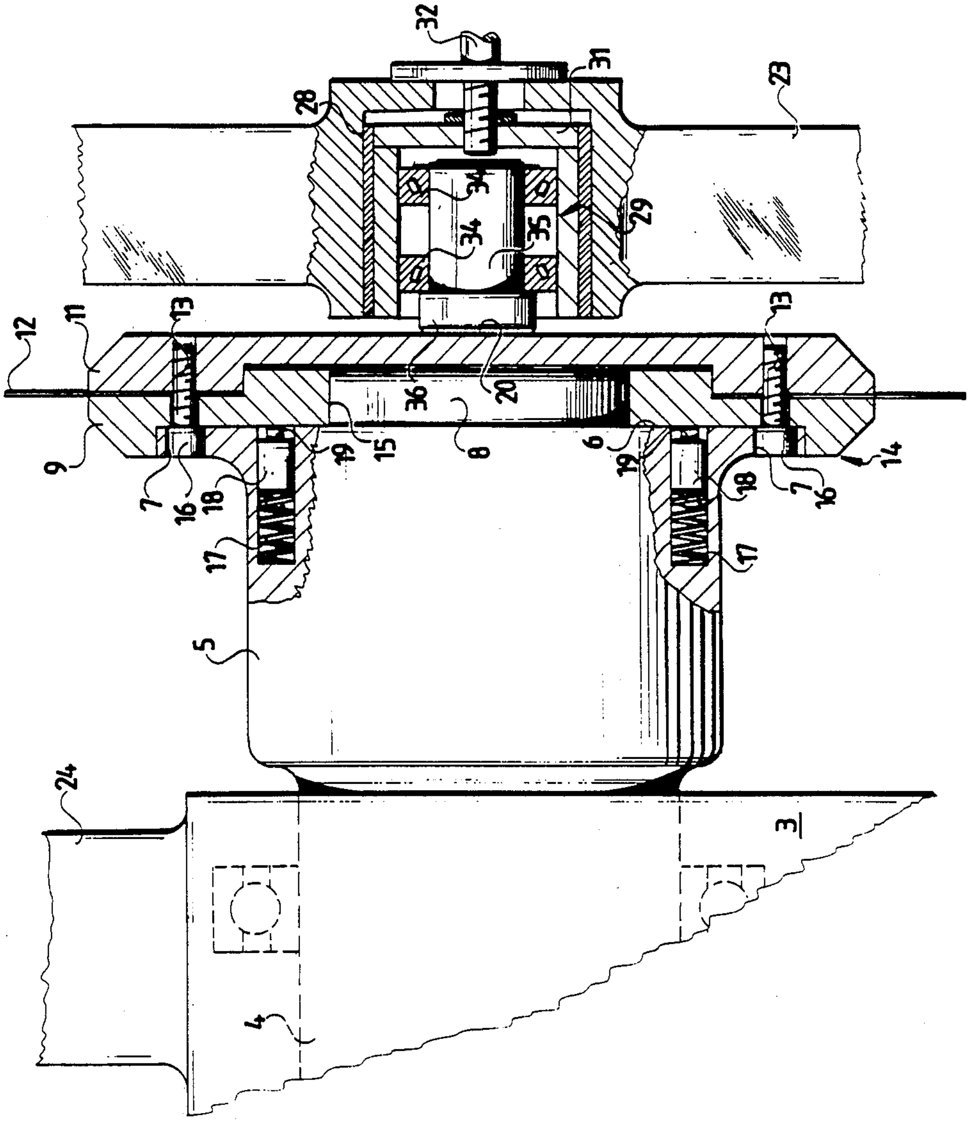
FIG. 2 is an enlarged, partly cross-sectional view of a device for clamping the circular saw blade.

As shown in the enlarged illustration in FIG. 2, the free end 5 of saw shaft 4 has a stop face 6 with recesses 7, designed as a flange on the face of the shaft. A projection 8 on shaft end 5 extends beyond the stop face 6.

A saw blade 12 is inserted in a concentric manner between two flanged rings 9, 11. The flanged rings 9, 11 are firmly connected to the saw blade 12 by means of threaded bolts 13 so as to form an exchangeable tool unit 14.

The flanged ring 9 has a central recess 15 designed to fit in a slidingly displaceable manner onto the projection 8 of shaft end 5. The flanged ring 11 is essentially designed as a disc having a plane face 20 at its center. When the tool unit 14 is pushed onto the shaft, the heads 16 of the threaded bolts 13 engage complementary recesses 7 forming a positive connection with these and establishing a connection between saw shaft 4 and tool unit 14 such that these rotate with each other. At the same time, the slidability of the tool unit 14 on the shaft end 5 is maintained.

Energy accumulating devices in the form of helical compression springs 17 are arranged in suitably designed recesses of shaft end 5 so as to act on thrust members 18 mounted in a slidingly displaceable manner in these recesses. The pins 19 on thrust members 18 are made to engage on the flanged ring 9 by compression springs 17 and hence attempt to move the tool unit 14 away from the stop face 6 (in FIG. 2 towards the right).

Figure 3:
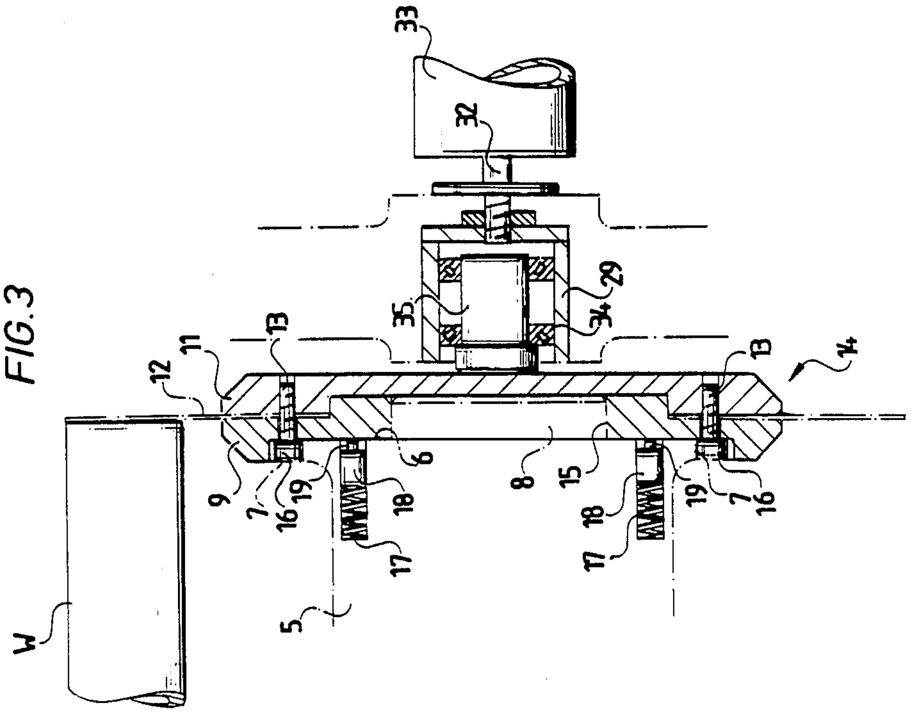

As shown in FIG. 1, a bracket 21 is attached to shaft 2 which is rigidly connected to the machine structure 1. An arm 23 is mounted on the bracket for pivotal motion about an axis 22 in the direction of arrow A. An angled arm 24 extends away from gearbox 3. The free leg 25 of arm 24 can be firmly connected to the free end 26 of arm 23 by means of a threaded bolt 27 or the like. In a friction bearing 28, approximately at the center of arm 23, a sleeve 29 is mounted for sliding displacement coaxially with saw shaft 4. The end of a piston rod 32 of a pressure medium cylinder 33 is screwed into the base 31 of sleeve 29 (pressure medium cylinder 33 is indicated in FIG. 3). When the pressure medium cylinder 33 is correspondingly actuated, the piston rod 32 is displaced in either one or the other direction, causing sleeve 29 to be displaced with it. The pressure medium cylinder 33 is fixedly connected to arm 23.

Inside the sleeve 29 a thrust plate 35 is mounted for rotation by means of rotary bearings known per se. The enlarged end 36 of the thrust plate 35 extends beyond the sleeve 29 and has a plane face which is capable of engaging centrically on the plane face 20 of the flanged ring 11 so the rotating tool unit 14 causes the thrust plate 35 to be rotated with it.

Figure 4:
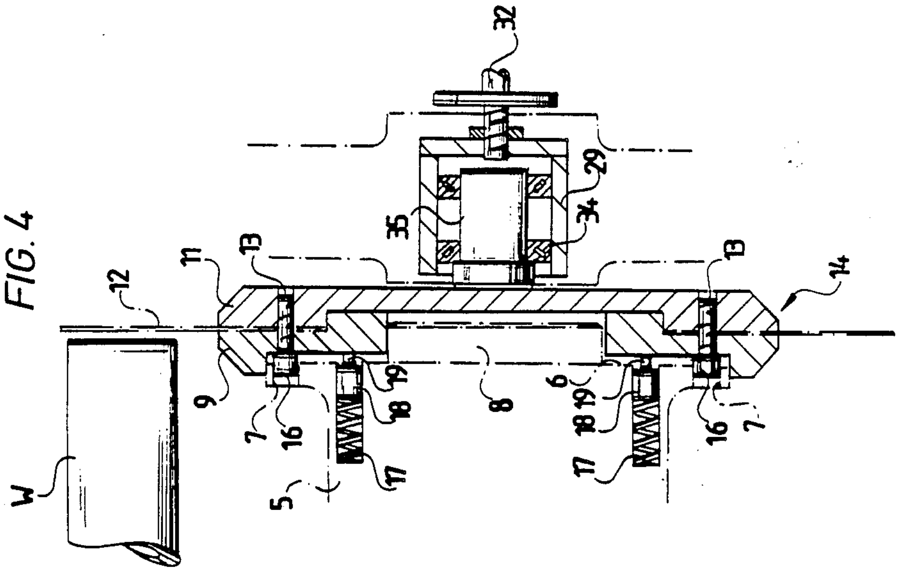
FIGS. 3 and 4 are schematic sectional views of the clamping device of FIG. 2 showing two different positions.

The described device functions in the following manner:

In the operating position shown in FIG. 3, the thrust plate 35 is pressed centrically against the flanged ring 11 by suitable actuation of the pressure medium cylinder 33 so the tool unit 14 formed by this ring, the saw blade 12 and the other flanged ring 9 is pressed against the stop face 6 of the shaft end 5 and assumes its normal operating position there. In this position, a section can be sawn off from the firmly clamped workiece W. When, as shown in FIG. 3, the saw blade 12 has sawn through the workpiece W by appropriate pivotal motion of the gearbox 3 (FIG. 1) and the cut-off section has been removed, the sleeve 29 and with it the thrust plate 35 are moved away from the tool unit 14 by suitable actuation of cylinder 33 (cf. FIG. 4) so the action of compression springs 17 now causes the tool unit 14 to be displaced a short distance on the saw shaft end 5 in such a manner that the saw blade 12 lifts off the face cut on the workpiece W and the gearbox 3 can now be returned to its initial position. Since the saw blade 12 has been lifted off the face cut on the workpiece W, this face cannot become damaged.

When the thrust plate 35 is retracted, the tool unit 14 slides on projection 8 of shaft end 5 and the heads 16 of the threaded bolts 13 are displaced in recesses 7. Prior to performance of the next cut, the tool unit 14 and with it the saw blade 12 are returned to the operating position shown in FIG. 3.

In the illustrated embodiment, the heads 16 of the threaded bolts 13 establish the connection between the tool unit 14 and the end 5 of saw shaft 4 enabling the tool unit 14 and the saw shaft 4 to rotate together. This joint rotation can also be achieved by a different type of connection, for example, by means of pins protruding from the stop face 6 and engaging in corresponding recesses in the flanged ring 9, thereby forming a positive connection enabling joint rotation of saw shaft 4 and tool unit 14, but allowing slidable displacement of tool unit 14. The helical compression springs 17 which press the saw blade 12 out of the position shown in FIG. 3 into the one represented in FIG. 4 may also be replaced by different types of energy accumulating devices such as, for example, small pressure medium cylinders.

A major advantage of the described device is that the ratio of the diameters of the flanged rings 9, 11 to the diameter of the saw blade 12 may be selected much more expediently than in known assemblies, for example, in a ratio of 1:2 instead of the customary 1:4 ratio. This enables use of thinner saw blades 12 than have been employed so far, which results in a smaller amount of chips being produced when workpieces W are parted.

A further important advantage of the described clamping device is that the tool unit can be changed automatically. To do so, it is merely necessary to release the connection between the end 26 of arm 23 and the leg 25 of arm 24 (cf. FIG. 1). This can be carried out automatically with suitable connection means. The arm 23 is then also automatically pivoted outwardly so the tool unit 14 consisting of the flanged rings 9, 11 and the saw blade 12 can be removed from the end 5 of saw shaft 4 by means of a tool changing device known per se and replaced by a new tool unit.

The present disclosure relates to the subject matter disclosed in German Application No. P 37 21 470.5 of June 30, 1987, the entire specification of which is incorporated herein by reference.

What is claimed is:

1. Device for clamping a circular saw blade at the free end of a rotatingly driven saw shaft which is mounted in a cantilever manner on part of a machine structure and has a stop face at its free end, characterized by the following features:

(A) said saw blade (12) is firmly clamped between two flanged rings (9, 11) and thereby connected to these so as to form an exchangeable tool unit (14);

(B) said tool unit (14) is mounted for sliding displacement on said free end (5, 8) of said saw shaft (4) and for rotation with said saw shaft (4);

(C) energy accumulating devices (17) are arranged between said tool unit (14) and said stop face (6) at the free end of said saw shaft (4) to act upon one (9) of said flanged rings and move said tool unit a short distance away from said stop face, while the connection between said tool unit and said saw shaft enabling these to rotate together is simultaneously maintained;

(D) a rotatingly mounted thrust plate (35) which can be pressed centrically against the other flanged ring (11) causes said tool unit (14) to engage firmly on said stop face (6).

2. Device as defined in claim 1, characterized in that said saw blade (12) is connected to both flanged rings (9, 11) by threaded bolts (13), and the heads (16) of these threaded bolts engage in complementary recesses (7) on said stop face (6) of said saw shaft (4) forming a positive connection with these.

3. Device as defined in claim 1, characterized in that a stop flange is provided on said saw shaft (4) as stop face (6).

4. Device as defined in claim 1, characterized in that said energy accumulating devices are in the form of compression springs (17).

5. Device as defined in claim 1, characterized in that pressure medium cylinders are provided as energy accumulating devices.

6. Device as defined in claim 1, characterized in that said thrust plate (35) can be pressed against said flanged ring (11) by a pressure medium cylinder (33).

7. Device as defined in claim 1, characterized in that said thrust plate (35) is mounted for rotation on a pivotable arm (23).

* * * * *